April 28, 1964   O. J. BRATZ   3,130,754
PUSH-PULL CABLE CASINGS
Filed Nov. 30, 1960   2 Sheets-Sheet 1
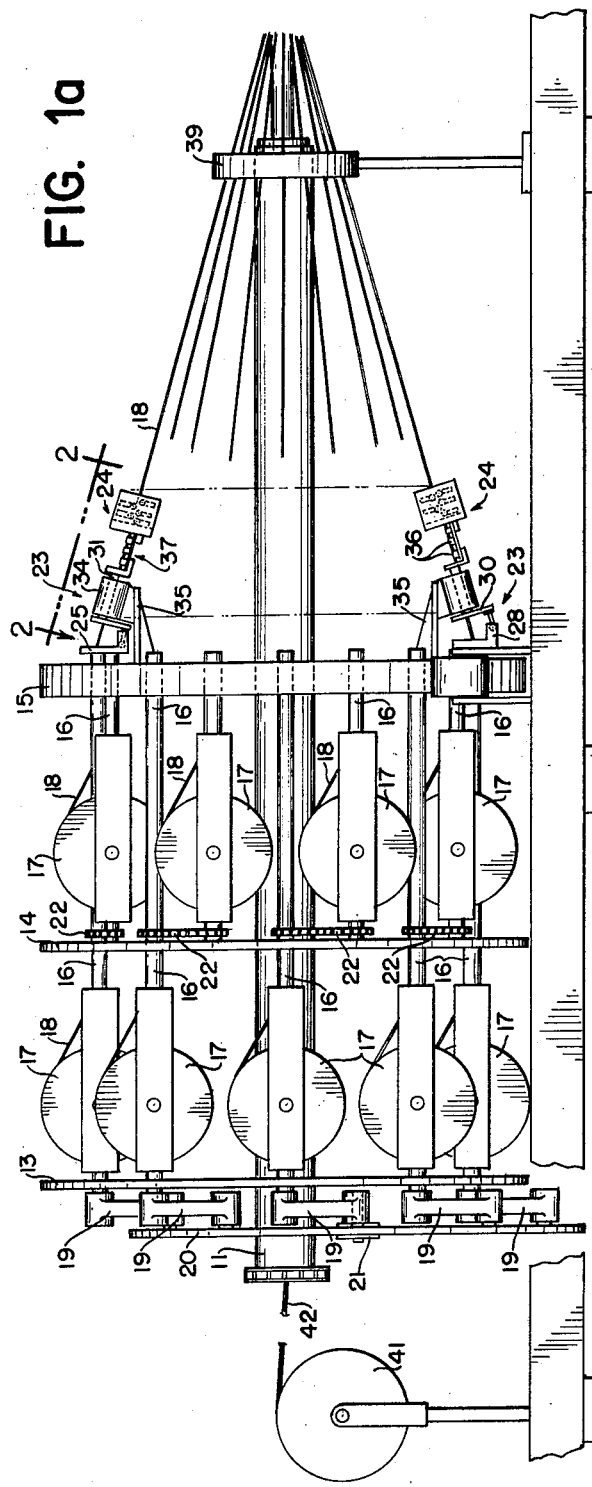
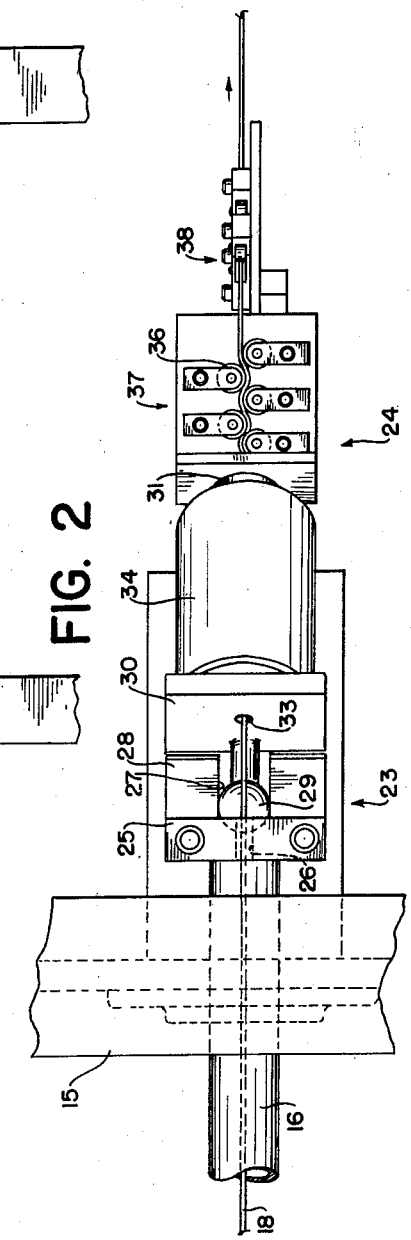
INVENTOR
OTTO J. BRATZ
BY Pennie, Edmonds,
Morton, Barrows and Taylor
ATTORNEYS INVENTOR
OTTO J. BRATZ
BY Pennie, Edmonds, Morton, Barrows & Taylor
ATTORNEYS

United States Patent Office 3,130,754
Patented Apr. 28, 1964

3,130,754
PUSH-PULL CABLE CASINGS
Otto J. Bratz, Adrian, Mich., assignor to American Chain & Cable Company, Inc., New York, N.Y., a corporation of New York
Filed Nov. 30, 1960, Ser. No. 72,753
5 Claims. (Cl. 138—133)

This invention relates to push-pull cable casings and the like and, more particularly, to a new method and apparatus for making such articles and to the articles produced thereby. The invention is characterized in that a plurality of wires are individually straightened during a long-lay helical stranding process so that they are in an elastic condition in the finished casing.

Push-pull cables consist generally of an inner displaceable control element extending through a tubular casing made up of a plurality of wires helically stranded side-by-side and covered with a plastic jacket. In order to reduce friction between the control element and its casing, the stranded wires of most conventional cables are wrapped helically in a relatively short lay or pitch, for example, one complete turn of each wire in a distance of about four or five cable diameters. This relatively short lay permits the cable to be bent without greatly displacing its neutral axis (that axis along which there is no change in length during bending) with respect to its geometrical axis. So long as the neutral axis remains substantially coincidental with the geometric axis, the inner control element can be pushed or pulled without being critically interfered by the casing.

However, when the wires of a push-pull cable casing define a short lay of this type, the cable is much more likely to be permanently deformed by the normal bending which it is expected to undergo. In such uses as in outboard motor control cables, for example, conventional casings often assume a definite curved set as a result of ordinary bending. This is clearly undesirable for many reasons, not the least of which is that a deformed cable cannot readily be put to other uses which require different bends and curves.

One of the major objectives of the present invention is the provision of a new push-pull cable which returns elastically to its straight form after being subjected to the normal bending which is likely to occur in use. This is achieved in accordance with the invention by lengthening the lay of the individual wires of the casing and, perhaps most importantly, by forming the casing of wires which are in the elastic condition. Consequently, the helical wires in the casing of one of the new push-pull cables is elastically disposed, and not permanently deformed, about the inner control element. The normal expected bending to which such cables are subjected cannot further deform the helical wires in the casing to the point where they bend plastically and fail to straighten into their original shape when the bending forces are removed.

Broadly stated, the invention provides a long-lay push-pull casing and the like comprising a plurality of work-hardened wires in the elastic condition laid helically side-by-side in tubular form, and a jacket of resinous material disposed about said wires. The new method of making such a casing comprises unwinding a plurality of spooled wires, straightening and work-hardening each of said wires as they are unwound, winding said wires helically side-by-side in a lay sufficiently long to prevent plastic deformation of said wires, and applying a jacket of resinous material about the helically wound wires. To carry out this method, the invention provides apparatus comprising planetary stranding means for helically winding a plurality of wires said-by-side, a plurality of separate straightening means associated with each wire wound by said stranding means for straightening said wires so that they remain elastic after being wound, and means for applying a jacket of resinous material about the helically wound wires.

As a result of straightening the wires of the casing and laying them in a helix of relatively long-lay, each wire remains in the elastic condition. Consequently, when a push-pull cable embodying the new casing is subjected to even the most severe normal bending the casing does not assume a permanent deformed set. Rather, it springs resiliently back into its oringal straight shape and therefore can be used again and again in different applications.

Various degrees of lay may be employed in accordance with the invention but in general the lay of the new cable casing is greater than that conventionally employed, i.e. more than about four to five times the diameter of the helix. Advantageously, the lay should be great enough to avoid plastic deformation of the straightened wires and yet sufficiently limited to avoid significant displacement of the neutral bending axis of the cable from its geometric axis. As described previously, this latter characteristic prevents critical interference between the casing and the control element operated therewithin.

A further advantage of the work-hardened long-lay wires in the new casing is that the wires are sufficiently straight to nest uniformly around a common center when they are helically stranded. This is not the case in ordinary casings where some minor deviation from straightness practically always exists in certain portions of at least some of the wires.

In addition, the invention provides an improved casing in that protection is afforded to pliable plastic tubing which is often employed as an inner component of the casing to house the control element. The long-lay elastic wires of the casing do not exert appreciable forces against this easily damaged inner tubing because stranding forces are minimal and the wires tend to spring radially away from the tubing against the containing outer jacket. In casings having relatively short-lay plastically deformed wires, however, stranding forces are high and the wires tend to crush the inner plastic tubing.

One of the major features of the method and apparatus of the invention is that the wires of the casing may be straightened as they are helically stranded in an entirely continuous operation. This is a considerable advantage from a production standpoint over straightening the wires by means of a separate operation prior to stranding. Also, the improvement insures that any curvature imparted to the wires as a result of spooling is eliminated since straightening is done after the spooled wire is unwound during the stranded process.

A preferred embodiment of the present invention is described below with reference to the accompanying drawings, wherein FIG. 1a is an elevation of part of the new apparatus for making push-pull cable casings and the like;

FIG. 1b is an elevation of the remainder of the apparatus of FIG. 1a;

FIG. 2 is a view of the wire-straightening means of the apparatus taken along line 2—2 of FIG. 1a;

Figure 1B:
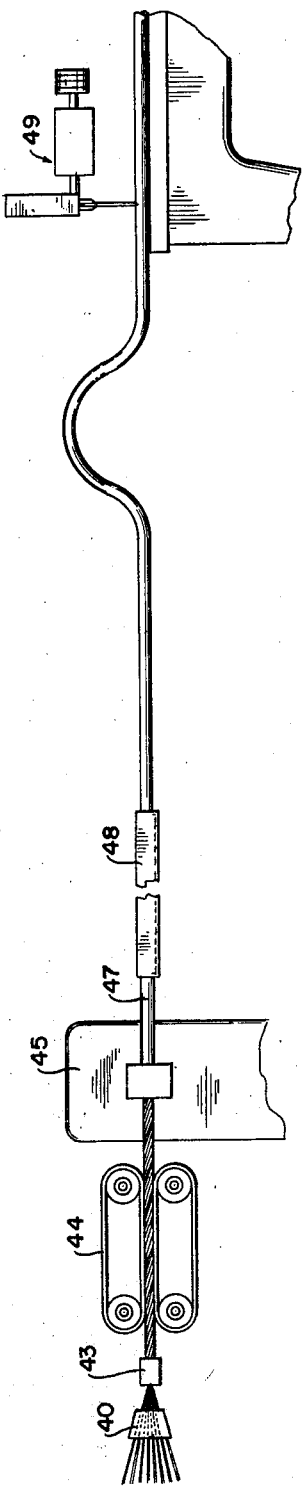

The apparatus of FIGS. 1a and 1b consists generally of a stranding machine having a hollow spindle 11 which extends along the central axis of the machine. Three discs 13, 14 and 15 are concentrically mounted on and longitudinally spaced along the spindle 11. Each disc 13, 14 and 15 extends in a plane perpendicular to the axis of the spindle 11 and is rotatable therewith.

A plurality of shafts 16 are rotatably mounted within and circumferentially spaced about the periphery of the disc 15 nearest the outlet end of the machine. Each of the shafts 16 extends from the disc 15 parallel to the spindle 11 with the opposite end of each shaft rotatably mounted and circumferentially spaced about the periphery of either the middle disc 14 or the disc 13 nearest the inlet end of the machine. A spool 17 of wire is mounted on each shaft 16 and a strand of wire 18 is adapted to be unwound therefrom through an axial bore in the shaft 16 toward the outlet end of the machine.

In the manner in which they are mounted, there are two distinct groups of spools oriented about the spindle 11. A first group is disposed between the disc 13 and the middle disc 14 and a second group longitudinally spaced from the first group is disposed between the middle disc 14 and the outlet disc 15. Moreover, each spool 17 is mounted so that rotation of the spindle 11 causes the spool 17 to orbit about the spindle 11 in the same direction as the spindle is rotated.

Operatively connected to the ends of the shafts of the first group are a plurality of crank arms 19. Each crank arm 19 is secured to ring 20 which is eccentrically mounted relative to the spindle 11 and extends in a plane parallel to the discs 13, 14 and 15. The eccentric ring 20 is adapted to revolve about stationary rollers 21 which are positioned to ride within its inner circumference. Hence, as the shafts of the first group orbit about the spindle 11, the eccentric ring 20 revolves about the stationary rollers 21 and the shafts are rotated by the crank arms in a direction opposite to the direction of rotation of the spindle 11. This rotation of the shafts of the first group is also transmitted to those of the second group by means of sprocket and chain assemblies 22 connecting the shafts.

This mechanism is so designed that as the spools 17 describe one complete orbital path of 360° about the spindle 11, they are also rotated 360° in a direction opposite to the rotation of the spindle. As a result, the spools 17 are always maintained in the same position relative to ground. The purpose of maintaining the spools 17 in a constant position relative to ground is to make certain that the wires 18 are not twisted as they are orbited about the spindle 11. Of course, this type mechanism is one of several ways in which this related motion could be effected. For example, a gear assembly having a 1:1 ratio and joining both the shafts and the spindle could produce the same motion. Alternatively, the spools could be mounted on and suspended from the discs in ferris-wheel fashion and the same effect would be had due to gravitational forces acting on the spool.

As best shown in FIG. 2, there is rigidly attached to each shaft 16 on the end extending from the disc 15 toward the outlet end of the machine a universal joint assembly 23. These universal joint assemblies 23 serve to attach wire straighteners 24 to the shafts 16 and maintain them at a constant angle relative to the spindle 11. It also serves to transmit the rotational and orbital movements of the shafts 16 to the straighteners 24.

Each universal joint assembly 23 comprises generally an L-shaped bracket 25 which is rigidly attached to the end of the shaft 16 and is rotatable therewith. As shown in FIG. 2, the shaft 16 is hollow along this end and the wire strand 18 which is unwound from the spool 17 is preferably passed through the shaft toward the outlet end of the machine. There is a small opening 26 provided in the bracket 25 which permits the wire strand 18 to pass therethrough. A slot 27 is formed in the longitudinal extension 28 of the L-shaped bracket 25 and is adapted to receive a ball 29 therein. The ball 29 is rigidly attached to a plate 30, which in turn is rigidly secured to and rotatable within a journal 31. An aperture 33 in the plate 30 allows the wire strand 18 to pass into and through an axial bore formed in the journal 31. The journal 31 turns in a bearing 34 which is inclined angularly toward the spindle 11. A bracket assembly 35, which is secured to disc 15, maintains the bearing 34 in its angular position spaced from the spindle 11.

Rigidly attached to the opposite end of the journal and rotatable therewith is the wire straightener 24. The wire straightener 24 consists of a plurality of rolls 36 longitudinally spaced from each other and transversely staggered so that the strand of wire 18 passing through the rolls is cold-worked with a substantially sinusoidal bending movement without appreciable friction. There are two sets of these rolls 36, the first set 37 differing from the second set 38 only in that it is rotated substantially 90°. Hence, the wire strand is sinusoidally worked in two planes so that it is satisfactorily straightened and also cold-worked into a harder and more rigid elastic condition.

Each wire straightener 24 is mounted to move in the same manner as its shaft 16 described above, i.e. it will orbit about the spindle 11 and will rotate in a direction opposite to the orbital path it describes about the spindle. As shown in FIG. 1a, after rotating 180° about the spindle, the wire straightener 24 is still maintained at a constant angle inclined toward the longitudinal extension of the spindle 11. As a result, the spools 17 and hence the wire strands 18 move together and remain in constant relationship with each other and the wire strands 18 are not twisted as they pass through the straightener 24 as would be the case if these members did not cooperate as described.

After leaving the straightener 24 the wire strands 18 converge toward the spindle 11, pass through holes in a guide 39 which serves to support the spindle at this point, and then are received by a strander head 40 as shown in FIG. 1b. The strander head 40 is mounted as a longitudinal extension of the spindle 11 and rotates with the spindle. It serves to maintain the wires properly spaced together and guides them in their proper helical arrangement.

A spool 41 containing plastic tubing 42 is shown in FIG. 1a mounted at the inlet end of the apparatus and tubing is unwound therefrom and is passed through the hollow spindle 11. This tubing 42 emerges from the spindle 11 at the outlet end thereof between the wires as they are helically wound. As a result, the wires are helically wound gently about the tubing 42 with the tubing serving as the inner component of the casing. It is to be noted that the wires could be helically wound into tubular form about a mandrel and the tubing 42 could be eliminated.

The tubing 42 with the wires 18 helically wound thereabout is next passed to a closing die 43 which closes the wound wires gently about the tubing. A caterpillar drive mechanism 44, advantageously driven by the strander apparatus, pulls the article through the closing die and directs it to an extrusion apparatus 45. Here, a resinous plastic jacket 46 is extruded around the wound wires to contain them therein against their tendency to unwind and radially expand. At this point, all the elements of a finished casing 47 have been applied. Immediately after extrusion of the jacket 44, the casing 47 is cured in a heating element 48. Finally, it is directed into a cutting machine 49 where it is cut to the desired length.

Figure 3:
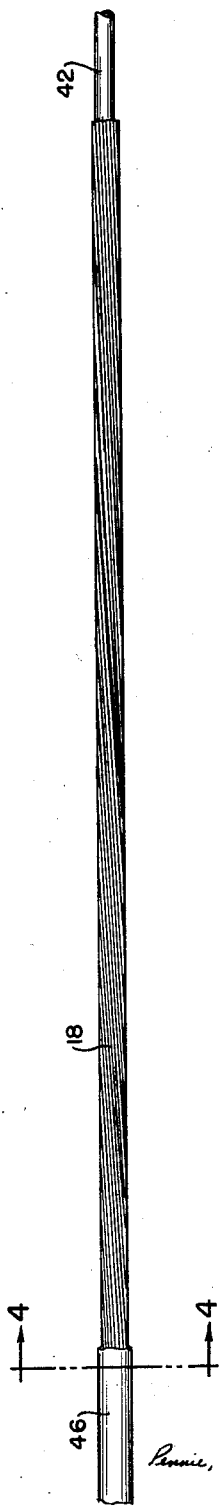
FIG. 3 is a side elevation partly broken away of the new cable casing.
Figure 4:
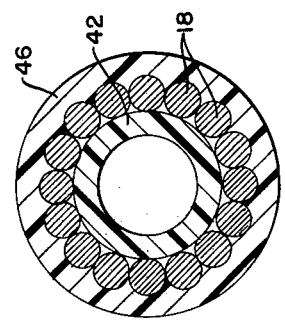
FIG. 4 is an enlarged section taken along line 4—4 of FIG. 3.

Referring to FIGS. 3 and 4, the push-pull cable casing produced by the above-described method and apparatus is shown in detail. It will be noted that the lay of the wires 18 is relatively long; the helix shown having a lay of approximately forty times its diameter. It has been found that for the various suitable straightened wires the lay should be at least ten times the helix diameter, and is most advantageously twenty to eighty times the helix diameter. Beyond this upper limit, it becomes difficult to avoid displacement between the neutral and geometrical axis during bending, and below the lower limit it becomes difficult to prevent permanent deformation of the wires. Since the wires 18 remain in the elastic condition, they tend to unravel if the outer jacket is stripped away. This is an advantage because it means that they apply only a gentle force radially against the inner plastic tubing 42 and thus does not tend to crush it.

As a result of straightening the wires in the manner described during the stranding process, production techniques in the making of this new casing are especially simple. Also, since the wires are drawn through anti-friction rollers to accomplish straightening, very little tension is required which would otherwise tend to deform the wires or damage the inner tubing. With regard to materials employed, a wide variation within the scope of the invention is permitted, but a high density polyethylene is particularly advantageous for both the inner plastic tubing and the outer extruded jacket. The wires themselves may be of a steel alloy or other metal.

I claim:

1. A push-pull cable casing and the like comprising a plurality of wires arranged helically side-by-side in tubular form, the helix described by each of said wires having a lay at least ten times the diameter of said helix, each of said wires being in the elastic condition and tending to spring radially outwardly into straight form, and outer containing means disposed about said wires for holding them circumferentially in their tubular form.

2. A push-pull cable casing according to claim 1 wherein the helix described by each of said wires has a lay of from twenty to eighty times the diameter of said helix.

3. A push-pull cable casing and the like comprising a length of inner plastic tubing, a plurality of wires arranged helically side-by-side in tubular form directly about said tubing, the helix described by each of said wires having a lay at least ten times the diameter of said helix, each of said wires being in the elastic condition and tending to spring radially outwardly into straight form without exerting substantial compressive force on said tubing, and outer containing means disposed about said wires for holding them circumferentially in their tubular form.

4. A push-pull cable casing according to claim 3 wherein the helix described by each of said wires has a lay of from twenty to eighty times the diameter of said helix.

5. A push-pull cable casing and the like comprising a length of inner plastic tubing, a plurality of wires arranged helically side-by-side directly about said tubing in tubular form, the helix described by each of said wires having a lay of from twenty to eighty times the diameter of said helix, each of said wires being in the elastic condition and tending to spring radially outwardly into straight form without exerting substantial compressive force on said tubing, and a jacket of resinous material extruded directly about said wires for holding them circumferentially in their tubular form.

References Cited in the file of this patent

UNITED STATES PATENTS

| | | |
|---|---|---|
| 1,882,326 | Kennedy | Oct. 11, 1932 |
| 2,055,223 | Robbin | Sept. 22, 1936 |
| 2,083,937 | Begg | June 15, 1937 |
| 2,187,873 | Bratz | Jan. 23, 1940 |
| 2,262,017 | Lilley | Nov. 11, 1941 |
| 2,558,763 | Lee | July 3, 1951 |
| 2,730,762 | Ballard | Jan. 17, 1956 |
| 2,787,917 | Schroeder | Apr. 9, 1957 |
| 2,800,683 | Taichmann | July 30, 1957 |
| 3,015,969 | Bratz | Jan. 9, 1962 |
| 3,063,303 | Cadwallader | Nov. 13, 1962 |